United States Patent Office 3,634,323
Patented Jan. 11, 1972

3,634,323
COMPOSITIONS COMPRISING A 1,2-EPOXY RESIN AND A NITROGEN CONTAINING HETEROCYCLIC COMPOUND
Raymond Michael Moran, Jr., Brick Town, N.J., assignor to Ciba Corporation, Summit, N.J.
No Drawing. Filed Sept. 26, 1969, Ser. No. 861,483
Int. Cl. C08g 30/04
U.S. Cl. 260—47 EP
12 Claims

ABSTRACT OF THE DISCLOSURE

This invention relates to 1,2-epoxy resin compositions wherein the epoxy resin contains more than one 1,2-epoxy groups per molecule, which compositions contain novel advancement catalysts selected from the group consisting of imidazoles, benzimidazoles, dihydropyrimidines, imidazolines, tetrahydropyrimidines, dihydroquinazolines, their salts and mixtures thereof; and to a process for preparing higher 1,2-epoxy resins from lower epoxy resins employing said advancement catalysts. The composition can be suitably used as intermediates in the preparation of cured epoxy resins of high molecular weight which are used as coatings, adhesions, electrical insulators and the like.

BACKGROUND OF THE INVENTION

This invention relates to epoxy resin compositions containing advancement catalysts. More particularly, this invention relates to epoxy resin compositions comprising an epoxy resin, and an effective amount of an advancement catalyst selected from the group consisting of imidazoles, benzimidazoles, dihydropyrimidines, imidazolines, tetrahydropyrimidines, dihydroquinazolines, their salts and mixtures thereof. As another feature, this invention relates to epoxy resin compositions comprising a dihydric phenol, an epoxy resin and one or more of the advancement catalysts mentioned above and to a process for preparing higher molecular weight epoxy resins therefrom.

The manufacture of high molecular weight epoxy resins has been accomplished in the past by reacting a low molecular weight epoxy resin with a dihydric phenol in the presence of an advancement catalyst such as alkali hydroxides and alkali earth hydroxides. These high molecular weight epoxy resins have been prepared in two stages; for example, by first reacting a dihydric phenol with an epihalohydrin in the presence of alkali to form a low molecular weight epoxy resin, treating this resin with an aqueous solution to remove soluble inorganics, and subsequently adding to this treated epoxy resin an additional amount of a dihydric phenol and effecting the final reaction in the presence of an alkali or alkali earth metal hydroxide, as an advancement catalyst, to form higher molecular weight epoxy resins. Attempts at effecting advancement of low molecular weight epoxy resins to high molecular weight epoxy resins in the presence of these alkaline catalysts have generally proven successful. However, a drawback is that the rate of reaction in preparing these higher molecular weight epoxy resins is generally too slow. Also, when larger quantities of these alkaline hydroxides have been used in these compositions, the reaction has been uncontrollable in that erratic condensation and polymerization occurs leading to branch-chain formations. For example, when 2000 p.p.m. of NaOH is used as an advancement catalyst, the composition upon slight heating forms a hard, infusible material, completely unsuitable for coating applications.

DETAILED DESCRIPTION OF THE INVENTION

It has now surprisingly been found that these disadvantages can be avoided when one employs, as advancement catalysts, in the epoxy resin dihydric phenol reaction, imidazoles, bezimidazoles, dihydropyrimidines, imidazolines, tetrahydropyrimidines, dihydroquinazolines, their salts derived from monocarboxylic acids containing 1 to 6 carbon atoms, or mixtures thereof, in a proportion of from about more than 2 to 2000 p.p.m. of catalyst based on the weight of the epoxy, preferably between 10 and 200 p.pm. and especially 20–75 p.p.m. It has also been found that the use of these catalysts lead to several other advantages; namely, (A) they selectively promote the desired epoxy phenolic hydroxy condensation, (B) the catalyst remains in the final epoxy resin and does not affect subsequent performance of the resin and (C) the combination of epoxy resin and catalyst have both room temperature as well as some elevated temperature shelf life. Therefore, as a particular advantage, one can combine these epoxy resins and the above catalysts, and allow the compositions to stand for any desired period of time and, subsequently, add the dihydric phenol to the composition in the preparation of the higher molecular weight epoxy resins. Still another advantage is that these advancement catalysts are not only fast-acting, but also relatively smaller amounts of these catalysts may be used in obtaining rates of reaction equivalent to other known advancement catalysts. Accordingly, one feature of this invention is directed to novel 1,2-epoxy resin compositions comprising a 1,2-epoxy resin, and from about more than 2 to 2000 p.p.m. of the above-mentioned advancement catalyst based on the weight of the 1,2-epoxy resin employed. Another aspect of this invention is directed to novel compositions containing a 1,2-epoxy resin, a catalyst as mentioned above and a dihydric phenol. The 1,2-epoxy resins of both compositions usually contain more than one and up to about two 1,2-epoxy groups per molecule, however resins with higher functionalities such as novalaks and triglycidyl compounds can be used. These compositions may suitably contain any 1,2-epoxy resin, including both liquid and solid resins. The epoxy resin component of these compositions can be conveniently prepared under conditions well-known to the art. For example, an epoxy compound, such as epihalohydrin or glycerol dihalohydrin, may be reacted at elevated temperatures with a dihydric phenol in the presence of an alkali hydroxide or other catalyst. The dihydric phenols are suitably those which are mentioned infra pages 8 and 9. Any desired molecular weight for this epoxy resin component can be prepared, by merely adjusting the ratio of epihalohydrin to dihydric phenol. For example, a low molecular weight 1,2-epoxy resin may be prepared by reacting one mol of a dihydric phenol with from 2–10 mols of an epihalohydrin and about two equivalents of an alkali. Higher molecular weight 1,2-epoxy resins can be made by using less than 2 mols of epihalohydrin to 1 mol of dihydric phenol, with the alkali being approximately equivalent to the epihalohydrin used. In the preferred aspect of this invention, the 1,2-epoxide resin employed, both in the compositions and as a reactant for the process, is a resin which is liquid at or below room temperature, or at elevated temperatures (i.e. up to 126° C.) and may have a molecular weight of up to about 2000.

The advancement catalysts which can be employed in this invention are imidazoles, benzimidazoles, dihydropyrimidines, tetrahydropyrimidines, imidazolines, dihydroquinazolines, their salts and mixtures thereof which may be substituted or unsubstituted. These compounds may contain at least 1 and at most 4 substituents on the carbon atoms and may also contain substituents on the nitrogen atoms. The only critical feature of these catalysts is that they be of the class described above. Accordingly, one may employ any suitable substituent on the carbon atoms, such as alkyl (of from 1–20 carbon atoms, preferably, lower alkyl of from 1–7 such as methyl, propyl, pentyl and the like), amino, monoalkylamino and dialkylamino, (of from 1–20 carbon atoms, preferably mono- and di-lower alkylamino of from 1–7 carbon atoms such as ethylamino, dipropylamino, hexylamino and the like), phenyl, carbalkoxy (of from 1–20 carbon atoms, preferably carb-lower alkoxy of from 1–7 carbon atoms such as carbomethoxy, carbobutoxy, carboisopropoxy and the like), mercapto, hydroxy, halo (such as chloro and bromo), azo, alkanoyl (of from 1–20 carbon atoms, preferably lower alkanoyl of from 1–7 carbon atoms such as acetyl, propionyl and the like), benzoyl, phenylthio, halophenyl (such as p-chlorophenyl, o-bromophenyl and the like), alkylthio (of from 1–20 carbon atoms, preferably lower alkylthio of from 1–7 carbon atoms, such as methylthio, pyropylthio, pentylthio and the like), cycloalkyl (such as cyclopentyl, cyclohexyl and the like), nitro, alkanoylamino (of from 1–20 carbon atoms, preferably from 1–7 carbon atoms such as acetylamino, propionylamino and the like), carbamido, hydroxyalkyl (of from 1–20 carbon atoms, preferably hydroxy lower alkyl of from 1–7 carbon atoms, such as hydroxymethyl, hydroxypropyl, hydroxybutyl and the like), anilino, alkenyl (of from 2–20 carbon atoms, preferably lower alkenyl of from 2–7 carbon atoms, such as prop-1-enyl, butyl-2-enyl and the like), aralkyl (of from 7–15 carbon atoms, preferably from 7–12 carbon atoms, such as benzyl, phenethyl, phenylpropyl and the like), alkaryl (of from 7–15 carbon atoms, preferably from 7–12 carbon atoms, such as methylphenyl, 2,4-dimethylphenyl, propylphenyl and the like) and alkanoic acid (of from 2–12 carbon atoms, preferably 2–7 carbon atoms such as acetic acid, butyric acid and the like). Suitable substituents on the nitrogen atoms may be alkyl, aryl, aralkyl, alk-aryl, phenoxy, alkanoyl, carboxy, alkanoic acid, hydroxyalkyl, —R—NH$_2$, —R—NHR, —R—N(R)$_2$, —R—SH, where R is alkyl, phenyl or aralkyl, and wherein in these various substituents the carbon chains are as further defined above.

As representative catalysts may be mentioned:

imidazole,
4-acetaminoimidazole,
5-acetaminoimidazole,
1-acetylimidazole,
4-aminoimidazole,
5-aminoimidazole,
2-(2-aminoethyl)-imidazole,
5-amino-1-methylimidazole,
1-benzoylimidazole,
2-benzylthioimidazole,
4,5-bis(p-bromophenyl)-imidazole,
2-chloroimidazole,
4-benzylthio-5-nitroimidazole,
5-benzylthio-4-nitroimidazole,
4-bromoimidazole,
5-bromoimidazole,
2-bromo-4,5-diphenyl-imidazole,
2-butylthio-2-cyclohexyl-4,5-diethylimidazole,
1,5-dimethylimidazole,
1-methylimidazole,
2-methylimidazole,
2-ethyl-4-methylimidazole,
2,4-dimethylimidazole,
4-methylimidazole,
1-methyl-4-phenylimidazole,
1-methyl-4-nitroimidazole,
5-nitromidiazole,
1-phenylimidazole,
2-phenylimidazole,
1-methylimidazole,
imidazole-4-acetic acid,
1-vinyl-2-methylimidazole,
imidazole-1-acetic acid,
imidazole-1-aniline,
5-butyramidoimidazole,
4-carboxamidoimidazole,
1-carbboxyimidazole,
2-carboxyl-1-benzylimidazole,
4,5-dicarboxamidoimidazole,
4,5-dicarboxyimidazole,
imidazole-1-ethanol,
2-thioimidazole,
2-acetamino-1-benzylbenzimidazole,
1-acetylbenzimidazole,
2-aminiobenzimidazole,
2-(1-aminobutyl)-4-amino-6-ethoxybenzimidazole,
2-amino-1-ethylbenzimidazole,
2-amino-1-methylbenzimidazole,
1-benzylbenzimidazole,
2-benzylaminobenzimidazole,
1-benzyl-2-chlorobenzimidazole,
2-benzyl-5-nitrobenzimidazole,
2-p-bromobenzylbenzimidazole,
2-butylthiobenzimidazole,
5-chlorobenzimidazole,
6-chlorobenzimidazole,
6-chloro-1,2-dimethylbenzimidazole,
5,6-dichlorobenzimidazole,
5,6-dimethylbenzimidazole,
5,6-dinitrobenzimidazole,
2-ethyl-5-nitrobenzimidazole,
1-methylbenzimidazole,
6-methyl-2-phenylbenzimidazole,
6-phenylbenzimidazole,
2-acetamino-N-methylbenzimidazole,
benzimidazole-2-acetic acid,
2-carboxamidobenzimidazole,
2-carboxy-benzimidazole,
2-carboyl-5-bromobenzimidazole,
2,4-dimethylimidazoline,
2-methylimidazoline,
1-vinyl-2-methylimidazoline,
2-ethyl-4-methylimidazoline,
2-chloromethyl-2-imidazoline,
2-methylimidazoline phenate,
imidazole lactate,
imidazoleacetate,
3,4-dihydro-4-phenylpyrimidine,
4-methyl-1,4,5,6-tetrahydropyrimidine,
3,4-dihydroquinazoline,
2-benzyl-2-imidazoline-4-carboxylic acid,
2-(1-naphthylmethyl)-2-imidazoline and
2-chloromethyl-2-imidazoline.

In the preferred aspect of this invention, the advancement catalysts employed are imidazoles, benzimidazoles, dihydropyrimidines, tetrahydropyrimidines, dihydroquinazolines and imidazolines which contain from 0–2 substituents and especially from 0–1 substituents. The preferred substituents being lower alkyl, ar-lower alkyl, lower alk-aryl, aryl, lower alkenyl, lower alkoxy and especially methyl, ethyl, phenyl and vinyl.

In the most preferred aspect of this invention the advancement catalysts are those of the imidazole and imidazoline series and especially imidazole, 1-methylimidazole, 2-methylimidazole, 2-ethyl-4-methylimidazole, 2,4-dimethylimidazole, 2-phenylimidazole, 1-vinyl-2 - methylimidazole, 2,4-dimethylimidazoline, 2-methylimidazoline, 2-ethyl-4-methylimidazoline and imidazole lactate.

As a further feature of this invention, it has been found that the novel advancement catalysts can be employed in combination with other known advancement catalysts in the compositions as well as the process of this invention. It has been found that one can use much less of the known advancement catalysts when employing in addition small amounts, i.e. 3 to 100 p.p.m. and especially 5 to 10 of the novel advancement catalyst and obtain an advanced resin in a much shorter time, then would similarly be obtained if the known advancement catalysts were employed alone in larger quantities. For example, it has been found that a mixture of 5 p.p.m. of imidazole and 35 p.p.m. of NaOH can be used to advance an epoxy resin in ½ hour at 195° C., whereas the same epoxy resin to be advanced to the same stage with NaOH alone, would require 180 p.p.m. of NaOH for a reaction time of 5½ hours. This particular feature of the invention equally applies when using any of the other advancement catalysts as well as other known advancement catalysts, such as alkali or alkali earth alkoxides, carbonates, hydroxides, benzoates, phosphates, silicates, higher carboxylates (from 8–20 carbon atoms) and the like (such as sodium methoxide, potassium carbonate, lithium hydroxide, lithium benzoate, sodium phosphate, sodium metasilicate and calcium octoate), or tetraalkyl ammonium halides or hydroxides, such as tetramethyl ammonium chloride or hydroxide. In the compositions of this invention the known advancement catalysts may suitably be employed with the novel advancement catalyst in concentrations of up to 200 p.p.m. and preferably 30–40 p.p.m.

As indicated previously, another aspect of this invention is a composition containing at least 3 components; namely, epoxy resin, advancement catalyst and dihydric phenol. The epoxy resin and advancement catalyst of this system are identical in all respects as that previously discussed. The particular dihydric phenol used in all the compositions of this invention and in the process subsequently described is not critical and, accordingly, may be any dihydric phenol which is well-known to the art for such purposes and which contains at least 2 phenolic hydroxy groups and may contain any number of other substituents which are inert to epoxy groups. For example, dihydric phenols which are within the contemplation of this invention may be represented by the following formulae:

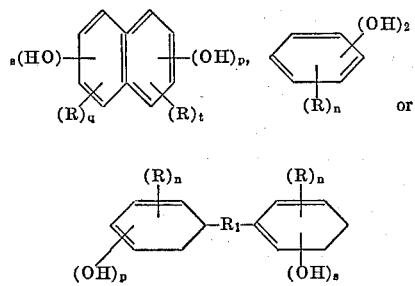

wherein R may be hydrogen, lower alkyl (of from 1–7 carbon atoms, such as mehtyl, propyl, t-butyl), halogen (bromo, chloro), aryl (such as phenyl and naphthyl), lower alk-aryl (wherein aryl moiety may be, for example, phenyl or naphthyl and alk from 1–7 carbon atoms; such as methyl, propyl and the like), ar-lower alkyl (such as phenyl and naphthyl lower alkyl wherein alkyl is from 1–7 carbon atoms, such as methyl, propyl, t-butyl and the like), cycloalkyl (i.e., cyclopentyl, cyclohexyl), cycloalkyl-alkyl (such as cyclopentyl, or cyclohexyl alkyl of 1–7 carbon atoms, such as methyl, propyl, t-butyl and the like), alkoxy (of from 1–20 carbon atoms, preferably from 1–7 such as methoxy, propoxy, 2-methoxyoctyl and the like), alkenyl (of from 2–20 carbon atoms, preferably from 2–7 carbon atoms, such as propen-1-yl, buten-2-yl and the like), and phenoxy; $R_1$ may be a bond between the two phenyl rings (i.e. to form a diphenyl moiety) or oxygen, sulfur, nitrogen, —$SO_2$—, a lower alkylene of from 1–10 carbon atoms (such as hexylene, methylene and the like), including both straight and branch-chain hydrocarbons, phenylmethylene or tolylmethylene and $n$, $q$ and $t$ may be integers of from 1–3; when one of $q$ or $t$ is 3 the other is less than 2; $p$ and $s$ being an integer of from 0–2 and the sum of $p$ and $s$ being at least 2. In the preferred aspect of this invention, the dihydric phenols are those wherein $R_1$ is methylene or isopropylene, R is hydrogen, bromine or lower alkyl, $p$ and $s$ are each 1, and $n$, $q$ and $t$ are each integers of from 0–2. Specific suitable dihydric phenols which may be mentioned are p,p'-dihydroxydiphenyl propane (bisphenol A), resorcinol, 1,4 - dihydroxynaphthalene, p,p'-dihydroxydiphenyl methane, 4,4'-dihydroxydiphenyl sulfone, tetrabromo- and tetrachloro-bisphenol A, pyrocatechol, hydroquinone, bis(4 - hydroxyphenyl)-methyl-phenyl-methane, bis-(4-hydroxyphenyl)-tolyl-methane, 4,4' - dihydroxydiphenyl and phenolphthaline.

The dihydric phenols that are reacted according to the process of this invention, or that are used as a component of the compositions of this invention can be the same as the dihydric phenol used to prepare the 1,2-epoxy resin component of the composition, or it can be different. For example, the diglycidyl either of bisphenol A can be reacted with bisphenol A or with resorcinol.

Both the two and three component compositions of this invention may, if desired, also contain other materials which are not curing agents; such as inert solvents, (i.e. methyl Cellosolve, xylene and the like), or terminating agents such as p-t-butylphenol. The only criticality of any additional material is that none be curing agents such as to form any substantial amount of cross-linking.

The relative amounts of 1,2-epoxy resin and dihydric phenol components of the three component composition of this invention are based upon the extent of advancement desired. For example, if one were to use equivalent amounts of dihydric phenol and 1,2-epoxy resins in the composition, the final product, after advancement, would be of high molecular weight and high weight per epoxide (W.P.E.). Similarly, if less than equivalent amounts were employed, the molecular weight and the W.P.E. of the final resin product would be correspondingly lower. For example, if one were to react 78% by weight of resin (containing 3% solvent) with 22% by weight bisphenol A, a W.P.E. of 450–530 would be obtained. Similarly, if 67% by weight of resin (containing 3% solvent) were reacted with 33% by weight of bisphenol A, a W.P.E. of 1650–2000 would be obtained. Therefore, according to this invention, one may employ 60–85% resin (containing 3% solvent) and 15–40% of dihydric phenol and, preferably, 65–80%, and 20–35% respectively. The advancement catalyst may be present in an amount of from more than 2 to 2000 p.p.m. based on the weight of the epoxy used and preferably of from 10–200 p.p.m. and especially 20–75 p.p.m. The dihydric phenol component may be the same or different from the dihydric phenol used to prepare the low molecular weight epoxy resin components. Preferably, however, the dihydric phenol is the same as that employed in the preparation of the initial resin. The compositions, as indicated previously, may suitably contain any inert solvent which, in such an event, may be later used as is, to prepare the high molecular weight epoxy resin by merely heating the composition.

Any of the composition of this invention may be conveniently prepared by merely admixing each of the components, in any order, in the desired quantities, including, if one wishes, with an appropriate solvent and/or terminator.

As an additional feature of this invention, it has been found that, in general, all types of 1,2-epoxy resins of lower molecular weight can be converted into essentially linear higher molecular weight epoxy resins when they are reacted with a dihydric phenol in the presence of an effective amount of an advancement catalyst selected from imidazoles, benzimidazoles, dihydropyrimidines, tetrahydropyrimidines, dihydroquinazoles, imidazolines, their salts, mixtures. One may also use up to 500 p.p.m. and salts, mixtures thereof. One may also use up to 500 p.p.m. and preferably 20 to 100 p.p.m. of the known advancement catalysts as previously described, in combination with one or more of these new advancement catalysts. The amount of known catalyst and new catalyst combination of course will depend upon the speed of reaction desired. The lower molecular weight 1,2-epoxy resin dihydric phenol and advancement catalyst employed in this process are those which has previously been described with reference to the compositions of this invention and, in the preferred process, are similarly those components which are indicated for the preferred compositions. The relative amount of epoxy resin, dihydric phenol and catalyst employed in the process are the same as those employed for the composition. The reaction may be carried out using the epoxy resin as the solvent as well as reactant; however, it is preferred to use an inert solvent or mixtures of inert solvents. Any high boiling inert solvent may be suitably employed, for example, high boiling ethers, ketones, hydrocarbons, halohydrocarbons and the like. In the preferred process, the reaction is carried out in the presence of about 1–25% and preferably 1–8% and especially 2–5% of an inert solvent and especially a mixture of inert solvents. The temperature at which the reaction is carried out may vary since, for the most part, the temperature only affects the reaction rate and, accordingly, time and temperature are interrelated; the lower the temperature, the longer the time of reaction. In general, a temperature of reaction ranging from 100–250° C. is employed, but preferably from 150–200° C. The reaction time at any particular temperature is determined by the viscosity and epoxy value desired in the final product; that is, the reaction is carried out until substantially all of the phenolic hydroxyls have reacted. The process may also suitably be carried out if desired, by using a terminator in the reaction, such as p-t-butylphenol, phenol, p-t-butylphenylglycidyl ether, or phenylglycidyl ether. When the final product is to be a solvent cut, then it is not necessary to remove the solvent after reaction. Otherwise, the solvents are removed by the usual methods (i.e. distillation). Contrary to other methods which employ inorganic bases, in the process of this invention it is not necessary to remove or deactivate the catalyst after reaction, for residual catalyst does not affect subsequent product performance.

A general procedure for carrying out the process is as follows: The epoxy resin, catalyst and calculated amount of dihydric phenol and, if desired, a solvent and/or terminator, is charged into a suitable reactor, preferably under an inert atmosphere, such as $N_2$, the reactants are heated for a period of time and subsequently the heat is removed and the reaction allowed to exotherm. The exotherm is allowed to dissipate and the reaction temperature controlled at the desired temperature until the epoxy and viscosity value which is desired is obtained.

The compositions of this invention, as well as the products prepared from the process are useful as intermediates in the preparation of cured epoxy resins of high molecular weight. These cured products are used as coatings, adhesions and electrical insulators.

The following examples are given by way of illustration. Examples 1 to 5 are carried out according to the following general procedure of Example 1.

EXAMPLE 1

Charge liquid resin, p-tert-butylphenylglycidyl ether, solvents and catalysts plus the calculated quantity of bisphenol-A to give the desired solid resin to a flask equipped with mechanical stirrer reflux condenser and nitrogen inlet tube. Heat the reactants to 180° C. in 30 minutes under nitrogen purge. Cut heat at 180° C. and allow mixture to exotherm. Drop the heating mantle when the exotherm temperature reaches 205° C. Allow exotherm to dissipate and control batch temperature to 195° C. Hold at 195° C. until the desired epoxy value and viscosity is obtained and then discharge the product.

| Charge | G. |
|---|---|
| Araldite 6010 (WPE 185–196) | 1,000.00 |
| Bisphenol-A | 299.00 |
| p-Tert-butylphenylglycidyl ether | 37.00 |
| Methyl Cellosolve | 5.00 |
| Xylene | 26.00 |
| Imidazole | 0.04 |
| Typical properties: | |
| Epoxy value, eq./100 g. | 0.194 |
| Viscosity (40% in butyl Carbitol), Gardner-Holdt | F–G |
| Softening point, Durran's ° C. | 67.5 |
| Non-volatile content, percent | 39.9 |
| Color-Gardner | 2–3 |
| Weight per epoxy (WPE) | [1] 450–530 |

[1] Reaction time 1 hour at 195° C.

Similarly, when .0016 g., .004 g., .10 g., .14 g. or 2.0 g. of imidazole is used in place of .04 g. of imadazole in the above example, similar results are obtained.

Similarly, when 5-acetamidoimidiazole,
1-acetylimidazole,
4-aminoimidazole
2-(2-aminoethyl)-imidazole,
1-benzoylimidazole,
5-benzylthio-4-nitroimidazole,
2-chloroimidazole,
4,5-bis(p-bromophenyl)-imidazole,
1,5-dimethylimidazole,
4-methylimidazole,
1-phenylimidazole,
1-nitroimidazole,
imidazole-4-acetic acid,
4-carboxamidoimidazole,
2-carboxy-1-benzylimidazole,
imidazole-1-ethanol,
2-thioimidazole,
1-acetylbenzimidazole,
2-aminobenzimidazole
1-benzyl-2-chlorobenzimidazole,
2-butylthiobenzimidazole,
6-chlorobenzimidazole,
2-ethyl-5-nitrobenzimidazole,
6-methyl-2-phenylbenzimidazole,
6-phenylbenzimidazole,
2-acetamino-N-methylbenzimidazole,
benzimidazole-2-acetic acid or
2-carboxy-5-bromobenzimidazole is used in equivalent amounts in place of imidazole in the above example, similar results are obtained.

Similarly, when the reactants are heated at 150° C. for 360 minutes or 210° C. for 15 minutes, similar results are obtained.

Similarly, when an epoxy resin prepared from tetrabromo bisphenol A and epichlorohydrin of molecular weight of approximately 800, 4,4-dihydroxydiphenyl sulfone and epichlorohydrin of molecular weight of approximately 400, hydroquinone and epichlorohydrin of molecular weight of approximately 230, and 4,4'-dihydroxydiphenyl and epichlorohydrin of molecular weight of approximately 300 is used in place of 6010, similar results are obtained.

Similarly, when an equivalent amount of toluene or benzene is used in place of xylene in the above example, similar results are obtained.

Similarly, when resorcinol 1,4-dihydroxynaphthalene, p,p' - dihydroxydiphenylmethane, 4,4' - dihydroxydiphenylsulfone, tetrabromobisphenol-A, hydroquinone, or pyrocatechol is used in an equivalent amount in place of bisphenol-A in the above example, similar results are obtained.

Similarly, when Example 1 is carried out without the use of the solvents xylene and methyl Cellosolve, similar results are obtained.

EXAMPLE II

WPE 1,650–2,000 (reaction time 1 hour at 195° C.)

Charge:
Same as Example I except use 520 g. of bisphenol-A

Typical properties:
| | |
|---|---|
| Epoxy value, eq./100 g. | 0.0534 |
| Viscosity (40% in butyl Carbitol), Gardner-Holdt | X–Y |
| Softening point, Durran's, ° C. | 116 |
| Non-volatile content, percent | 40.0 |
| Color, Gardner | 3 |

EXAMPLE III

WPE 2,500–4,000 (2½ hours at 195° C.)

Charge:
Same as Example I except use 559.6 g. bisphenol-A.

Typical properties of product dissolved 1:1 in Cellosolve acetate-xylene:
| | |
|---|---|
| Epoxy value, eq./100 g., on solid content | 0.027 |
| Viscosity (40% in 1:1 Cellosolve acetate-xylene), Gardner-Holdt | U–V |
| Non-volatile content, percent | 39.9 |
| Color, Gardner | 4–5 |

EXAMPLE IV

WPE 875–1,025 (30 minutes at 195° C.) and corresponding dehydrated castor oil (DCO)—ester Charge and Procedure for Ester Cook Same as Example I except use 439 g. of bisphenol-A. Follow the general procedure until a WPE of 875–1,025 and a viscosity of Q–U at 40% N.V. in butyl Carbitol is obtained. Add:

40% p.b.w. DCO fatty acid
1.28 g. anhydrous sodium carbonate
51.0 g. xylene

Increase heat to 243° C. and process the vehicle to a viscosity of T maximum (Gardner-Holdt scale) at 50% non-volatile in xylene and an acid number of 5 maximum.

Typical properties of DCO ester:
| | |
|---|---|
| Acid number, mg./g. | 4.2 |
| Viscosity (50% N.V. in xylene), Gardner-Holdt | L |
| Color, Gardner | 3 |
| Non-volatile content, percent | 50.5 |

EXAMPLE V

WPE 875–1,025 and corresponding DCO ester

The same products are prepared as in Example IV by substituting 0.09 g. of imidazole lactate in place of imidazole in Example I and following the general procedure. Imidazole lactate can be prepared by reacting at least equimolecular quantities of imidazole and 85% lactic acid in water at 80° C. for one hour.

EXAMPLE VI

Composition comprising liquid resin and catalyst

The following is a typical composition containing an epoxy resin and an advancement catalyst.

(a)
| | G. |
|---|---|
| Epoxy resin 6010 | 1000 |
| p-t-Butylphenylglycidyl ether | 37 |
| Methyl Cellosolve | 5 |
| Xylene | 26 |
| Imidazole | .04 |

The composition is prepared by adding all of the above components and heating the entire mixture at 70° C. for 1 hour. The properties of this composition are as follows:

| Test | CTM | Properties |
|---|---|---|
| Visual appearance | 39 | (1) |
| Color | 40 | 2 |
| Epoxy value, eq./100 g. | 110 | 0.503 |
| Viscosity, 25° C., cps. | 116 | 3968 |
| Pounds/gallon, 25° C. | 55 | 9.55 |
| Flash point, ° F. | 41 | 395 |

[1] Clear, no contamination.

The epoxy resin 6010 is prepared as follows:

520 parts of 2,2-bis(4-hydroxyphenyl) propane and 1300 parts of epichlorohydrin and 25 parts of water are heated to 60° C. with agitation and 180 parts of flaked sodium hydroxide are added in several increments and the temperature maintained at 60° C. for 30 minutes following the addition of the final increment. Unreacted epichlorohydrin and water are then removed under vacuum. The reaction mixture is cooled at 90° C. and about 700 parts of water are added. The mixture is agitated for 30 minutes at 90° C., permitted to settle and the brine layer is drawn off. The material is washed with water, vacuum stripped and cooled under vacuum and discharged. An epoxy resin is obtained having a Brookfield viscosity at 23° C. of 13,000 cps. and an epoxy value of 5.3 eq./kg.

Similar compositions are prepared by employing the following concentration of components:

(b)
| | G. |
|---|---|
| Epoxy resin 6010 | 1000 |
| p-t-Butylphenylglycidyl ether | 45 |
| Methyl Cellosolve | 10 |
| Xylene | 15 |
| Imidazole | .08 |

(c)
| | |
|---|---|
| Epoxy resin 6010 | 1000 |
| p-t-Butylphenylglycidyl ether | 30 |
| Methyl Cellosolve | 5 |
| Xylene | 35 |
| Imidazole | .02 |

Similarly, when 5-acetamidoimidazole,
1-acetylimidazole,
4-aminoimidazole,
2-(2-aminoethyl)-imidazole,
1-benzoylimidazole,
5-benzylthio-4-nitroimidazole,
2-chloroimidazole,
4,5-bis(p-bromophenyl)-imidazole,
1,5-dimethylimidazole,
4-methylimidazole,
1-phenylimidazole,
1-nitroimidazole,
imidazole-4-acetic acid,
4-carboxamidoimidazole,
2-carboxy-1-benzylimidazole,
imidazole-1-ethanol,
2-thioimidazole,
1-acetylbenzimidazole,
2-aminobenzimidazole,
1-benzyl-2-chlorobenzimidazole,
2-butylthiobenzimidazole,
6-chlorobenzimidazole,
2-ethyl-5-nitrobenzimidazole,
6-methyl-2-phenylbenzimidazole,
6-phenylbenzimidazole,
2-acetamino-N-methylbenzimidazole,
benzimidazole-2-acetic acid or
2-carboxy-5-bromobenzimidazole,
1-methylimidazole,
2-methylimidazole,
2-ethyl-4-methylimidazole,
2,4-dimethylimidazole,
2-phenylimidazole,
1-vinyl-2-methylimidazole, 2,4-dimethylimidazoline,
2-methylimidazoline,
2-ethyl-4-methylimidazoline or imidazole lactate is used in equivalent amounts in place of imidazole in the above example, similar results are obtained.

Similarly, compositions may be prepared as described above (a), (b) and (c) excluding the solvent and/or terminator.

The above compositions are used to prepare any of the products described in the examples by simply adding the correct quantity of bisphenol-A or other dihydric phenol as indicated previously and following the general procedure.

EXAMPLE VII

The following is a comparison of the stability of the [resin and catalyst composition of Example VI (a)] composition of this invention with a similar composition, wherein the catalyst is sodium hydroxide. The composition as shown in Example VI (a) is kept at 90° C. for a period of time as indicated below. Epoxy and viscosity values are shown for each one week period:

Initial epoxy value, eq./100 g. _____ 0.503
Initial viscosity, cps. _____ 3,873
One-week epoxy value, eq./100 g. _____ 0.501
One-week viscosity, cps. _____ 4,992
Two-week epoxy value, eq./100 g. _____ 0.491
Two-week viscosity, cps. _____ 6,258
Three-week epoxy value, eq./100 g. _____ 0.490
Three-week viscosity, cps. _____ 6,915

The following is the stability of a comparable sodium hydroxide system.

Composition:
    6010, 1,000.000 g.
    p-Tert-butylphenol, 24.000 g.
    Sodium hydroxide, 0.180 g.
    Cellosolve acetate, 32.000 g.

|  | Epoxy value, eq./100 g. | Viscosity, cps. |
|---|---|---|
| Time: | | |
| Initial | 0.489 | 6,143 |
| 1 week | 0.475 | 8,884 |
| 2 weeks | 0.473 | 10,125 |
| 3 weeks | 0.468 | 11,248 |

EXAMPLE VIII

The following table indicates color, viscosity and epoxy values of an advanced resin system when using various catalysts of this invention. The starting resin composition is that shown in Example IV, except for the catalyst which is shown below. The final advanced resin is one having a W.P.E. value of 875–1,025. The reaction is carried out as shown in Example IV.

EXAMPLE IX

The following example demonstrates the surprising, beneficial effect of employing a small amount of imidazole advancement catalyst with the known NaOH advancement catalyst, in contrast to the use of NaOH alone.

A mixture as shown in Example IV using 180 p.p.m. of NaOH (based on the weight 6010) in place of 0.04 g. imidazole is heated at 195° C. for 5½ hours to arrive at the specification described below Three similar reactions were carried out using 10 p.p.m.+30 p.p.m., 5 p.p.m.+35 p.p.m. and 2 p.p.m.+38 p.p.m. of imidazole and NaOH respectively in place of imidazole in the compositions of Example IV and the reaction carried out at 195° C. for ½ hour to arrive at the same specification as that in the NoOH run.

The results are as follows:

|  | NaOH alone | Imidazole | | |
|---|---|---|---|---|
|  |  | 10 p.p.m. | 5 p.p.m. | 2 p.p.m. |
| Imidazole, gms. | | .0100 | .0050 | .0020 |
| Sodium hydroxide | [1] 180 | 0.030 | .0350 | .0380 |
| Viscosity (40% in butyl Carbitol) | P–U | P–Q | Q | M–N |
| Solids content, percent | 39–41 | 39.3 | 39.5 | 3.96 |
| Epoxy value, eq./100 g. | 0.098–0.11 | 0.105 | 0.110 | 0.113 |
| Color (Hellige) | [2] 2 | 2 | 2 | 2 |

[1] P.p.m.  [2] Maximum.

What is claimed is:

1. A curable composition comprising a 1,2-epoxy resin, containing more than one 1,2-epoxy group per molecule, a dihydric phenol and from about 10 to 200 p.p.m. of an advancment catalyst selected from the group consisting of imidazoles, benzimidazoles, imidazolines, dihydroquinazolines, tetrahydropyrimidines, their salts derived from monocarboxylic acids containing 1 to 6 carbon atoms and mixtures thereof.

2. A composition of claim 1 wherein the advancement catalyst is selected from the group consisting of imidazole, benzimidazole, dihydropyrimidine, imidazoline, tetrahydropyimidine, mixtures thereof and substituted imidazoles, benzimidazoles, dihydropyrimidine, imidazolines, tetrahydropyrimidines and mixtures thereof, wherein the substituents on the carbon atoms are selected from the group consisting of alkyl, amino, monoalkylamino, dialkylamino, phenoxy, carboxyl, carbalkoxy, mercapto, hydroxy, halo azo alkanoyl, benzoyl, phenylthio, halophenyl, alkylthio, cycloalkyl, nitro, alkanoylamino, carbamido, hydroxyalkyl, anilino, alkenyl, ar-alkyl, alk-aryl and alkanoic acid; and the substituents on the nitrogen atoms are selected from the group consisting of alkyl, aryl, ar-alkyl, alk-aryl, phenoxy, alkenoxyl, carboxy, alkanoic acid, hydroxyalkyl, —R—NH$_2$, —R—NHR, —R—N(R)$_2$, —R—SH, wherein R is selected from the group consisting of aryl, alkyl, phenyl and aralkyl.

3. A composition of claim 1 wherein the 1,2-epoxy resin

| Catalyst | Concentration 500 g. 6010 type system | 30 minutes at 195° C. | | |
|---|---|---|---|---|
| | | Ga4dner-color | Visc. (40% in butyl Carbitol) | Epoxy value (eq./100 g.) |
| 1-methylimidazole | 0.02 | 1–2 | S–T | 0.101 |
| 2-methylimidazole | 0.02 | 1–2 | S–T | 0.101 |
| 2-ethyl-4-methylimidazole | 0.02 | 1–2 | T–U | 0.100 |
| 1,2-dimethylimidazole | 0.02 | 3–4 | T | 0.100 |
| 2,4-dimethylimidazole | 0.02 | 1–2 | R | 0.095 |
| 2-phenylimidazole | 0.02 | 1–2 | R–S | 0.100 |
| 1-vinyl-2-methylimidazole | 0.02 | 2 | Q–R | 0.100 |
| Imidazole | 0.02 | 2–3 | Q–R | 0.108 |
| Benzimidazole | 0.075 | 2–3 | R | 0.103 |
| 2,4-dimethylimidazoline | 1.0 | 1–2 | S–T | 0.100 |
| 2-methylimidazoline | 1.0 | 1–2 | Q–R | 0.109 |
| 2-ethyl-4-methylimidazoline | 1.0 | 1–2 | R | 0.106 | is present in an amount of 60 to 85% based on the weight of total composition.

4. A composition of claim 1 wherein the advancement catalyst is selected from the group consisting of imidazole, 1-methylimidazole, 2-methylimidazole, 2-ethyl-4-methylimidazole, 2,4 - dimethylimidazole, 2 - phenylimidazole, 1-vinyl-2-methylimidazole, 2,4-dimethylimidazoline, 2-methylimidazoline and 2-ethyl-4-methylimidazoline.

5. A composition of claim 1 wherein the 1,2-epoxy resin has a molecular weight of up to about 2,000 and is the reaction product of an epihalohydrin and a dihydric phenol of the formulae

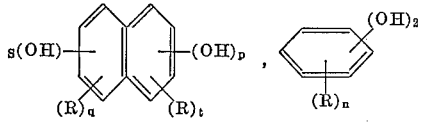

or

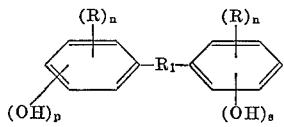

wherein R is selected from the group consisting of hydrogen, bromine and lower alkyl; $R_1$ is selected from the group consisting of methylene and isopropylene; $p$ and $s$ are each 1 and $n$, $q$ and $t$ are each integers of from 0.2; the 1,2-epoxy resin is present in an amount of from 60 to 85% by weight based on the total weight of composition; the dihydric phenol component of the composition is as indicated above; the advancement catalyst is selected from the group consisting of imidazole, 1-methylimiddimethylimidazole, 2-phenylimidazole, 1-vinyl-2-methylazole, 2-methylimidazole, 2-ethyl-4-methylimidazole, 2,4-dimethylimidazole, 2-phenylimidazole, 1 - vinyl-2-methylimidazole, 2,4-dimethylimidazoline, 2-methylimidazoline and 2-ethyl-4-methylimidazoline.

6. A composition of claim wherein the 1,2-epoxy resin has a molecular weight of 340 to 800 and is the reaction product of epichlorohydrin and bisphenol A; and the advancement catalyst is selected from the group consisting of imidazole, 1-methylimidazole, 2-methylimidazole, 2-ethyl-4-methylimidazole, 2,4-dimethylimidazole, 2-phenylimidazole, 1-vinyl-2-methylimidazole, 2,4-dimethylimidazoline, 2-methylimidazoline and 2-ethyl-4-methylimidazoline and is present in an amount of from about 20 to about 75 p.p.m. based on the weight of the 1,2-epoxy resin.

7. A process for preparing higher molecular weight 1,2-epoxy resins from lower molecular weight 1,2-epoxy resins containing more than one 1,2-epoxy group per molecule, which comprises heating at elevated temperatures a 1,2-epoxy resin with a dihydric phenol in the presence of from about more than 10 to 200 p.p.m. based on the weight of 1,2-epoxy resin of advancement catalyst selected from the group consisting of imidazoles, benzimidazoles, dihydropyrimidines, tetrahydropyrimidines, and imidazolines.

8. The process of claim 7, wherein the 1,2-epoxy resin reactant has a molecular weight of up to about 2,000 and is present in an amount of from about 60 to about 85% by weight based on the total composition.

9. The process of claim 7, wherein the temperature of reaction is from 100 to 250° C.

10. The process of claim 7, wherein the advancement catalyst is selected from the group consisting of imidazole, 1-methylimidazole, 2-methylimidazole, 2-ethyl-4-methylimidazole, 2,4-dimethylimidazole, 2-phenylimidazole, 1-vinyl-2-methylimidazole, 2,4-dimethylimidazoline, 2-methylimidazoline and 2-ethyl-4-methylimidazoline, the 1,2-epoxy resin reactant has a molecular weight of from about 222 to about 2,000 and is prepared from an epihalohydrin and a dihydric phenol selected from the group consisting of p,p'-dihydroxydiphenyl propane (bisphenol-A), resorcinol, 1,4-dihydroxynaphthalene, p,p'-dihydroxydiphenyl methane, 4,4'-dihydroxydiphenyl sulfone, tetrabromo- and tetrachloro-bisphenol-A, pyrocatechol, hydroquinone, bis - (4-hydroxyphenyl)-methyl-phenylmethane, bis(4 - hydroxyphenyl) - tolyl-methane, 4,4'-dihydroxydiphenyl and phenolphthaline.

11. The composition of claim 1 wherein in addition there is present a known advancement catalyst.

12. The process of claim 7 wherein a known advancement catalyst is employed in addition to said advancement catalyst.

References Cited
UNITED STATES PATENTS 3,329,652   7/1967   Christie _____ 260—47 EPC
3,356,645   12/1967   Warren _____ 260—47 EPCN WILLIAM H. SHORT, Primary Examiner T. E. PERTILLA, Assistant Examiner U.S. Cl. X.R.

117—161 ZB; 260—2 EP, 18 EP, 59 R